Feb. 20, 1962 J. E. GARRETT 3,021,747
METHOD AND WASHER MEANS INCLUDING A CALIBRATED RUBBER
LAYER FOR MEASURING BOLT TENSION
Filed March 19, 1953
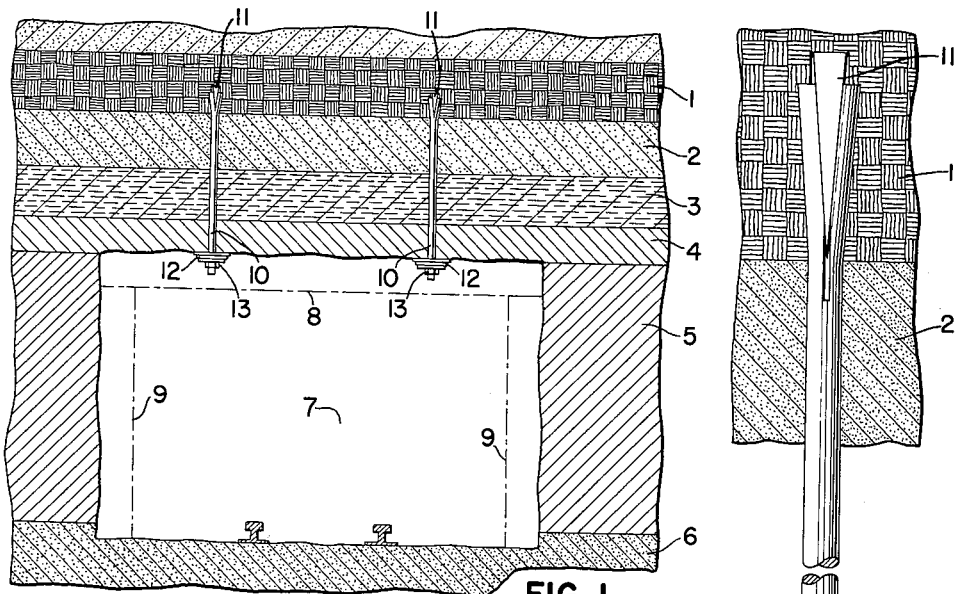
FIG. 1
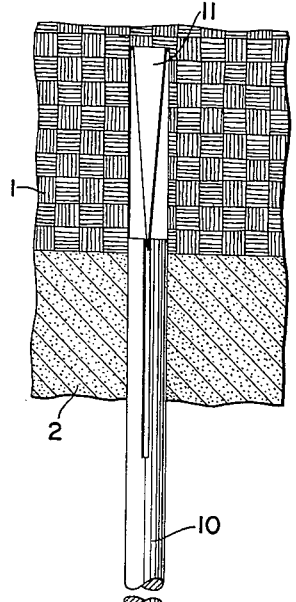
FIG. 2
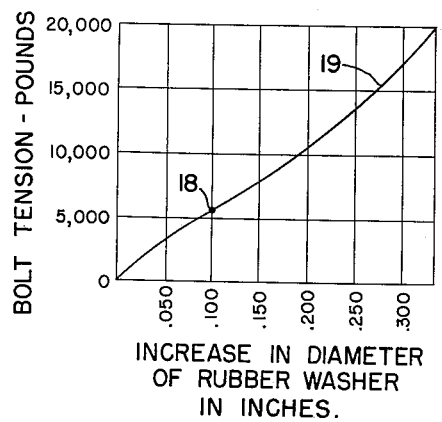
FIG. 4
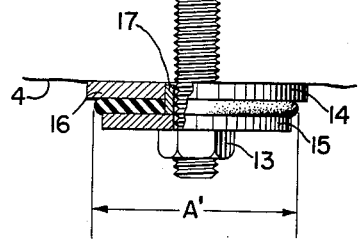
FIG. 3
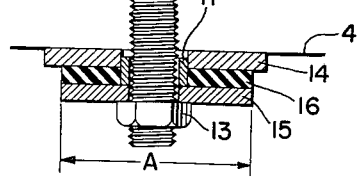
INVENTOR.
JOHN E. GARRETT
BY
R. L. Miller
ATTORNEY United States Patent Office 3,021,747
Patented Feb. 20, 1962

3,021,747
METHOD AND WASHER MEANS INCLUDING A CALIBRATED RUBBER LAYER FOR MEASURING BOLT TENSION
John E. Garrett, St. Marys, Ohio, assignor, by mesne assignments, to The Goodyear Tire & Rubber Company, a corporation of Ohio
Filed Mar. 19, 1953, Ser. No. 343,480
9 Claims. (Cl. 85—62)

The present invention relates to a method and apparatus for measuring the tension in roof bolts, such as are used for supporting the roofs of mine passages, but the scope of the invention is not limited solely to such use.

One object of this invention is to provide for this purpose a washer composed in part of a readily deformable material, such as rubber, having known deformation characteristics, thus permitting ready determination of the compressive forces by a measurement of the deformation in said material. By measuring the deformation of the rubber the tension in the bolt can be readily determined.

Another object of this invention relates to a method of determining and checking the tension in such bolts in a very simple and efficient manner. The method comprises the step of placing a compressible rubber pad, preferably arranged between two flat surfaces in such a position as to be deformed by a tension placed in a bolt with which the pad is associated. The method contemplates the utilization of the deformation of the rubber in conjunction with a calibrated chart or other means showing the deformation characteristics of the rubber, the deformation being measured by a suitable caliper or the like.

Other objects of this invention will appear hereinafter as the description hereof proceeds.

In the drawings:

FIG. 1 is a cross section through a mine passage showing roof bolts in place and provided with the improved compressible washers of this invention;

FIG. 2 is an enlarged detail view of a bolt provided with a washer not under compression:

FIG. 3 is a view similar to FIG. 2 showing the washer under compression; and

FIG. 4 is a calibration chart showing a deformation curve for a particular rubber compound used in the washer.

Roof bolts for supporting the roofs of mine passages and the like are not new in and of themselves and it has been customary to provide a metal washer adjacent the threaded end of the bolt against which the nut threaded on the bolt is adapted to be impinged. It has been customary in tightening the nuts on the bolts to use a torque-wrench but such a means for securing the initial tension in the bolts has not proven to be entirely satisfactory because the metal plates which have been provided as washers are not uniform in their frictional coefficients, the threads on the bolts themselves become impaired in handling and rust and other types of corrosion make it impossible to be sure the proper tension is in the bolt. Also, the torque-wrench is not a good means for measuring the tension in a bolt already in place, especially if there is too much tension in the bolt. It should also be obvious that sometimes a nut will become so rusted to a plate that, even though the bolt does not have much tension in it, the torque-wrench cannot turn the nut under the given torque, with the result that no knowledge would be gained as to the lack of tension in the bolt.

It is necessary to periodically check the tension in the bolts because the bolts themselves may become loose at their upper ends or there may be a shift in the rock causing too much tension, or in some cases the shift may lessen the tension. All of these problems have been present heretofore and the present invention has nothing to do with correcting conditions in the support of mine roofs except to the extent of providing a quicker and more accurate method of determining bolt tension. Millions of these bolts are used every month and their use is increasing, especially in what is known as the hard-rock mines. It therefore has become important that some simple method be devised for quickly measuring the tension in the bolts periodically and the present invention is one means of assuring a relatively accurate and quick method of making this determination. It has been found that it is not necessary to equip all bolts with washers made according to this invention but a sufficient number of the same should be employed to provide means of checking conditions at frequent intervals along a mine passage. It is entirely possible that this invention will at some time be found to be economical enough for use with all bolts instead of using plain metal washers, but from a practical standpoint it has been found unnecessary to equip all bolts with the improved washer.

Referring now to the drawings, there is illustrated in FIG. 1 a section of the earth having layers 1, 2, 3, 4, 5 and 6 through which there has been formed a passage 7 which we will refer to as the mine passage. It has been customary in such passages to provide timbering such as the cross timber indicated by dotted lines at 8, and vertical timbers indicated by dotted lines at 9. This arrangement cuts down on the size of the passage and by using roof bolts increased working space is obtained. Also, there is a distinct saving in the cost of the roof bracing. The advantages of this increased working space are well known and need no repetition here.

Roof bolts, such as 10, are placed in drilled holes in the roof and the upper ends of the bolts are each split to receive a wedge 11, whereby when the bolts are driven into the bolt openings the wedges spread the split ends of the bolts to anchor the bolts firmly in the roof of the mine passage. The lower ends of the bolts project into the mine passage and washers 12 of this invention are slipped over the ends of the bolts and the nuts 13 are employed to put a tension on the washer 12.

In FIG. 2 there is shown a detail of the washer of this invention applied to a roof bolt and it comprises a circular plate 14 and a circular plate 15 arranged parallel to each other and having an interposed layer of rubber 16. This rubber is preferably vulcanized to the plates 14 and 15, or otherwise secured to said plates so that the abutting surfaces are immovably fixed with respect to each other. The upper plate 14 is preferably but not necessarily larger than the lower plate 15, which latter plate is preferably of an outer diameter commensurate with the outer dimension of the rubber adhered thereto. The upper plate 14 and the rubber layer 16 have somewhat larger openings at the center than the plate 15, the latter only being sufficiently large to surround the bolt 10. A sleeve 17 having an internal bore substantially the same size as the central opening in the plate 15 is arranged within the aligned openings in the plate 14 and rubber layer 16 in abutting relation with plate 15 and with a sliding fit with respect to the plate 14 and rubber layer 16. The sleeve 17 may also be conveniently welded to the plate 15 to hold it in position but the sleeve should preferably not be bonded to the rubber. The sleeve 17 is somewhat less in length than the combined thickness of the plate 14 and the rubber layer 16 so that when the rubber is compressed the sleeve 17 will not normally be driven into contact with the layer 4 of the rock and thus limit the compression of the rubber. The purpose of this sleeve 17 is to prevent the rubber in the pad from being forced into the threads of the bolt and into the openings formed in the plates 14 and 15. Thus the only manner in which the rubber 16 can expand is at the outer edge where the expansion or deformation can be readily measured. The sleeve 17 also has another function and that is, it prevents excess compression of the rubber pad, for when the sleeve 17 abuts against the layer 4 no further compression of the rubber will take place. This would prevent destruction of the pad by over-loading.

As a specific example of a washer of this kind, it has been found that a satisfactory washer for this purpose can be made by using a ⅜" steel plate 14 about 6" in diameter, a plate 15 of the same thickness but about 5" in diameter and a rubber compression layer 16, ⅜" in thickness and having an outer diameter equal to the outer diameter of the plate 15. The sleeve 17 need not be of any particular thickness but it should preferably be at least about ⅛" thick and of a length approximately ⅛" less than the combined thicknesses of the plate 14 and rubber layer 16.

Referring now to FIG. 3, it will be noted that the rubber is under compression and has been reduced in thickness, causing a lateral bulging of the edges thereof. Since the rubber is bonded to the plates, only the median portion moves out and the edges bulge outward and become rounded as illustrated. A caliper, preferably of the ring type (not shown) or any suitable means for measuring the outer diameter, is then employed to measure the bulge, thus indicating the increase in diameter of the rubber layer. The amount of compression in the rubber layer would, by reference to the chart, be interpreted as a function of the tension in the bolt. As an example, an increase in diameter of the pad, equivalent to .1", would be measured as approximately 5500 pounds tension in the bolt, see point 18 on chart FIG. 4.

Since rubber characteristics are different, it is important to know the characteristic of the particular rubber employed and to furnish with a quantity of these washers a calibration chart for determining bolt tension. Such a chart is indicated in FIG. 4 in which the vertical ordinate represents the tension in the bolts in pounds and the horizontal ordinate represents the increase in the diameter of the pad in inches. The curve 19 shown on this chart represents a curve to be used in connection with determining the tension in the bolts for a particular rubber compound. Another lot of washers might have a different curve because of the difference in compounding etc. A separate chart would be used for each lot of washers of a given compound and these washers would always be checked against that particular chart.

The use of these washers provides a quick and economical way for measuring roof bolt tension to determine not only the tension in the bolt but by analysis of that tension, check the condition of the mine roof layers to determine the condition thereof, such as whether the layers are shifting and need additional support.

The term "rubber" as used herein is meant to include synthetic rubber and other similar relatively soft pliable masses that are readily deformable due to loads exerted thereon, and which have characteristics similar to those of rubber or synthetic rubber.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. A load measuring washer for use with bolts such as those used in supporting the roof of a mine passage, comprising a pair of plates having flat opposed surfaces, a layer of rubber of known calibrated load deformation characteristics interposed between said plates and vulcanized thereto, said plates and said rubber layer having aligned openings with the opening in one plate being of substantially the same diameter as the opening in said rubber and the opening in the other plate being somewhat smaller than that in the rubber, and a sleeve mounted in the openings in said rubber and said first plate and having an outer diameter substantially that of the openings in said first plate and rubber, the end of the sleeve adjacent said other plate being in abutting relation to said other plate and being connected thereto to move therewith, said sleeve being of a length materially less than the combined thickness of said rubber and said first plate under no-load conditions, the outer edges of said layer being exposed for measurement of the deformation thereof under load whereby, when said layer is compressed by said plates on application of load applied thereto, the lateral deformation of the edges of the layer may be measured and the load on the washer, and thus the tension in the bolt with which it is used, may be determined by reference to the known calibration for the rubber.

2. A load measuring washer for use with bolts such as those used in supporting the roof of a mine passage, comprising a pair of plates having flat opposed surfaces, a layer of rubber of known calibrated load deformation characteristics interposed between said plates and vulcanized thereto, said plates and said rubber layer having aligned openings with the opening in one plate being of substantially the same diameter as the opening in said rubber and the opening in the other plate being somewhat smaller than that in the rubber, and a sleeve mounted in the openings in said rubber and said first plate and having an outer diameter substantially that of the openings in said first plate and rubber, the end of the sleeve adjacent said other plate being in abutting relation to said other plate, said sleeve being of a length materially less than the combined thickness of said rubber and said first plate under no-load conditions the outer edges of said layer being exposed for measurement of the deformation thereof under load whereby, when said layer is compressed by said plates on application of load applied thereto, the lateral deformation of the edges of the layer may be measured and the load on the washer, and thus the tension in the bolt with which it is used, may be determined by reference to the known calibration for the rubber.

3. A load measuring washer for use with bolts such as those used in supporting the roof of a mine passage, comprising a pair of plates having flat opposed surfaces, a layer of rubber of known calibrated load deformation characteristics interposed between said plates and vulcanized thereto, said plates and said rubber layer having aligned openings with the opening in one plate being of substantially the same diameter as the opening in said rubber and the opening in the other plate being somewhat smaller than that in the rubber, and a sleeve mounted in the openings in said rubber and said first plate and having an outer diameter substantially that of the openings in said first plate and rubber, the end of the sleeve adjacent said other plate being in abutting relation to said other plate, said sleeve being of a length materially less than the combined thickness of said rubber and said first plate under no-load conditions, the said rubber being in the form of a flat disk, the outer edge of which is concentric with the opening therein, the outer edges of of said layer being exposed for measurement of the deformation thereof under load whereby, when said layer is compressed by said plates on application of load applied thereto, the lateral deformation of the edges of the layer may be measured and the load on the washer, and thus the tension in the bolt with which it is used, may be determined by reference to the known calibration for the rubber.

4. A load measuring washer for use with bolts such as those used in supporting the roof of a mine passage, comprising a pair of plates having flat opposed surfaces, a layer of rubber of known calibrated load deformation characteristics interposed between said plates and vulcanized thereto, said plates and said rubber layer having aligned openings with the opening in one plate being of substantially the same diameter as the opening in said rubber and the opening in the other plate being somewhat smaller than that in the rubber, and a sleeve mounted in the openings in said rubber and said first plate and having an outer diameter substantially that of the openings in said first plate and rubber, the end of the sleeve adjacent said other plate being in abutting relation to said other plate, said sleeve being of a length materially less than the combined thickness of said rubber and said first plate under no-load conditions, the said rubber being in the form of a flat disk, the outer edge of which is concentric with the opening therein, said other plate having the outer edge thereof terminating at the outer edge of said disk, the outer edges of said layer being exposed for measurement of the deformation thereof under load whereby, when said layer is compressed by said plates on application of load applied thereto, the lateral deformation of the edges of the layer may be measured and the load on the washer, and thus the tension in the bolt with which it is used, may be determined by reference to the known calibration for the rubber.

5. In a load-measuring washer for use with bolts such as those used in supporting the roof of a mine passage, comprising the combination of a pair of rigid plates, a layer of rubber of substantial thickness and known calibrated load-deformation characteristics interposed therebetween and bonded thereto, said plates and rubber layer having aligned perforations for receiving a bolt, and a sleeve arranged in the perforation in said rubber layer in abutting relation with the wall of said latter perforation and at least co-extensive therewith, the said layer having the outer edge thereof exposed and free to expand at said outer edge in a direction parallel to said plates when the washer is under load whereby the deformation of the edges may be measured and the load on the washer determined by reference to its known load-deformation characteristics.

6. A load-measuring washer for use with bolts such as those used in supporting the roof of a mine passage, comprising a pair of circular rigid plates, a disk of rubber of known calibrated load-deformation characteristics interposed therebetween and bonded thereto, said plates and disk having aligned perforations for receiving a bolt, a rigid sleeve arranged in the perforation in said rubber layer in abutting relation with the walls of said latter perforation and being at least co-extensive with the wall of said latter perforation and having one end thereof lapping the walls of the perforation in an adjacent plate with a sliding fit, the said rubber layer having the outer edge thereof exposed and free to expand at said outer edge in a direction parallel to said plates whereby when said layer is compressed by said plates on application of a load applied thereto, the lateral deformation of the edges of the layer may be measured and the load on the washer, and thus the tension in a bolt with which it is used, may be determined by reference to the known calibration of the rubber.

7. A load-measuring washer for use with bolts such as those used in supporting the roof of a mine passage, comprising a pair of rigid plates, a layer of rubber of known calibrated load-deformation characteristics interposed therebetween and bonded thereto, said plates and rubber layer having aligned perforations for receiving a bolt, and a rigid sleeve arranged in the perforation in said rubber layer in abutting relation with the wall of said latter perforation and being at least co-extensive with the walls thereof, said sleeve having one end thereof secured to one of said plates to form an integral part thereof, the said rubber layer having the outer edge thereof exposed and free to expand at said outer edge in a direction parallel to said plates whereby, when said layer is compressed by said plates on application of a load thereto, the lateral deformation of the edge may be measured and the load on the washer, and thus the tension of the bolt with which it is used, may be determined by reference to the known calibration for the rubber.

8. The method of measuring the force exerted on an object by pressure creating means which comprises the steps of interposing between said object and said means a deformable element comprising a pair of plates having flat opposed surfaces and a layer of resilient material of known calibrated load deformation characteristics positioned between the plates and bonded thereto with the outer edges of said layer being unconfined to permit unlimited deformation under load in said layer parallel to said plates, applying force to said object through said interposed element by said means, measuring the amount of deformation of said layer at said edges, and determining by the deformation-load calibration for said resilient material the load on said element.

9. The method of measuring the tension in a roof bolt of a mine passage which is braced by bolts fixed into prepared openings in the roof with the threaded end of the bolts extending below the undersurface of the roof and having nuts threaded thereon, which comprises interposing between the roof and the nut for said bolt a washer composed of two plates having a layer of rubber therebetween and bonded thereto, the rubber having predetermined and controlled calibrated deformation characteristics, the outer edges of said rubber layer being unconfined to permit unlimited deformation under load in said layer parallel to said plates, tightening the nut upon the bolt thereby forcing the interposed washer toward the roof, measuring the amount of deformation of the rubber layer at said edges, and determining by the deformation-load calibration for said rubber the load on said washer.

References Cited in the file of this patent

UNITED STATES PATENTS

| | | |
|---|---|---|
| 128,602 | Dittman | July 2, 1872 |
| 1,994,388 | Erichsen | Mar. 12, 1935 |
| 2,464,152 | Ralston | Mar. 8, 1949 |
| 2,596,361 | Blancher | May 13, 1952 |
| 2,643,904 | Wehmanen | June 30, 1953 |
| 2,697,914 | Joy | Dec. 28, 1954 |
| 2,725,843 | Koski | Dec. 6, 1955 |
| 2,738,754 | Bierer | Mar. 20, 1956 |

FOREIGN PATENTS

| | | |
|---|---|---|
| 10,752 | Australia | Jan. 2, 1934 |